United States Patent [19]

Herman et al.

[11] 4,442,703

[45] Apr. 17, 1984

[54] PIPE TESTING APPARATUS

[76] Inventors: Fred L. Herman, 11931 Kemp Hollow La., Houston, Tex. 77043; Kenneth H. Johns, Box 316, County Rd. 80, Manvel, Tex. 77578

[21] Appl. No.: 358,243

[22] Filed: Mar. 15, 1982

[51] Int. Cl.³ ............................................. G01M 3/28
[52] U.S. Cl. ..................................................... 73/49.5
[58] Field of Search ...................... 73/49.5, 49.6, 49.8, 73/49.1; 137/493.4

[56] References Cited

U.S. PATENT DOCUMENTS 1,044,234  11/1912  Parre et al. ........................ 137/493.4
2,633,739   4/1953  Potts et al. ........................... 73/49.5
4,254,655   3/1981  Keast et al. .......................... 73/49.5

Primary Examiner—Gerald Goldberg
Assistant Examiner—Hezron Williams
Attorney, Agent, or Firm—Vaden, Eickenroht, Thompson, Bednar & Jamison

[57] ABSTRACT

There is disclosed apparatus for use in hydrostatically testing a length of pipe, wherein the pipe is closed at both ends, and a pin is provided for interchangeably connecting hoses leading from high volume, low pressure and low volume, high pressure pumps to one such end closure, whereby the pipe may be filled with water, the water pressurized, and then drained from the pipe following the test. A valve is mounted within the pin to which the pump hoses are connected so as to prevent the loss of water from the pipe, as the pressure hose replaces the fill hose, but nevertheless permit the water to be drained from the pipe through the end closure and hose connection with the pressure pump.

9 Claims, 4 Drawing Figures

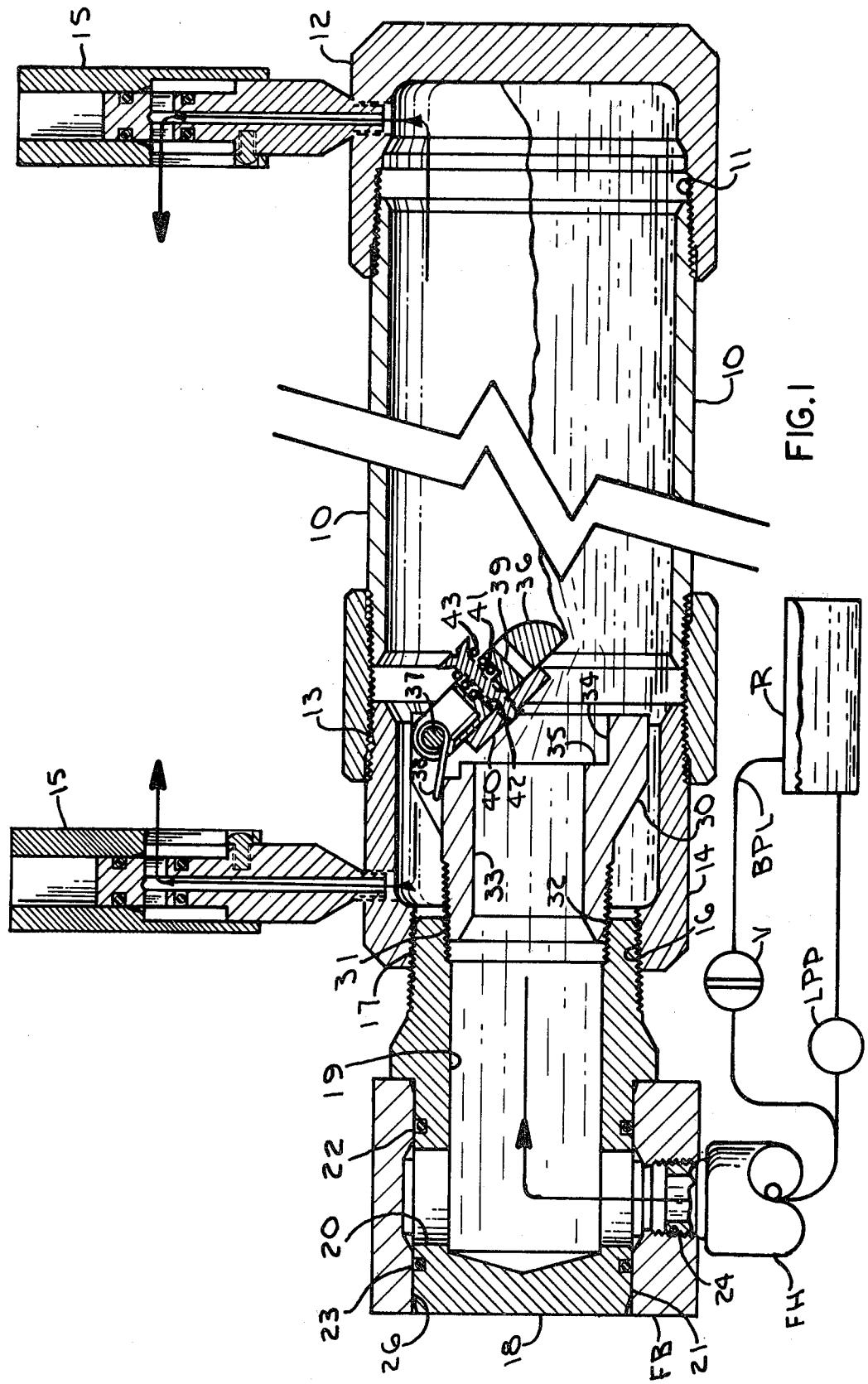

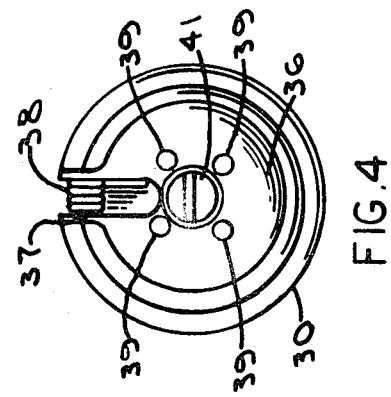
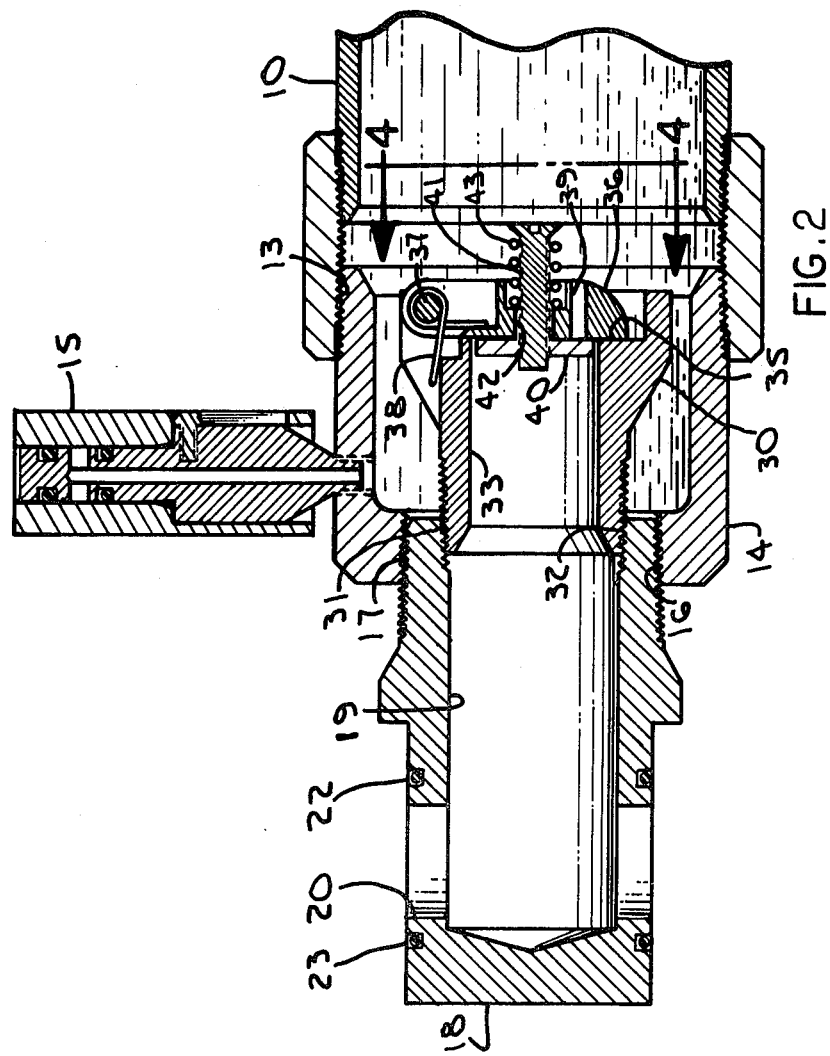

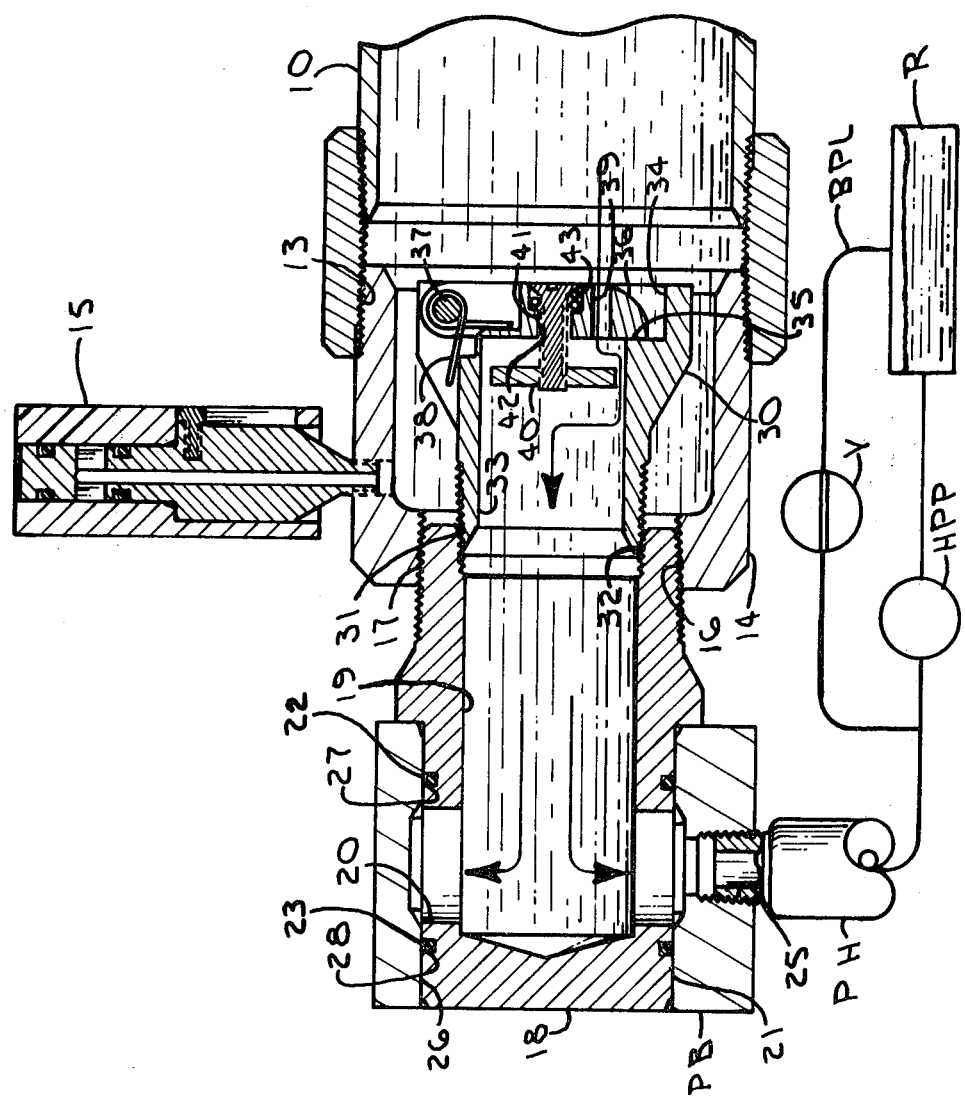

PIPE TESTING APPARATUS

This invention relates to apparatus for use in hydrostatically testing a length of pipe. More particularly, it relates to improvements in apparatus of this type wherein the pipe is closed by means which includes a plug at each end, one of which plugs has a passageway to which hoses from high volume, low pressure and low volume, high pressure pumps may be interchangeably connected, whereby, with the fill hose connected thereto, the pipe may be filled with water, and with the fill hose replaced by the pressure hose, pressure may be applied to the water to test the pipe, following which the water may be drained from the pipe and the pressure hose disconnected from the plug for use along with the fill hose in testing another length of pipe.

In an effort to speed up the procedure, it has been proposed to use a connection between each of the interchangeable pump hoses and plug which may be made up and broken out quicker than the standard threaded joint. For this purpose, complementary parts of a hammer union are installed on the opposite ends of each hose and a pin threadedly connected to a hole in the end of the plug. The pin provides a means by which the hoses to be connected to a wide variety of plugs for closing the ends of different sizes of pipes. It has also been proposed to interchangably connect the hoses and pin by means of blocks connected to the ends of the hoses and having cylindrical bores which are adapted to be fitted over the outer ends of the pin. Although these are even more quickly made up and broken out, the replacement of one pump with another nevertheless results in a fairly substantial amount of water loss, which must be made up with the high pressure, low volume pump.

It has also been proposed to install a check valve in the connection between the hoses and the pin to retain the fill water as the hoses are changed. However, since this valve also prevents water from being drained from the pipe after testing, water pressure must be bled off through the bleed valve before removing the hose to drain the pipe. In order to speed up the test procedure, the bleed valve would of course preferably be of a quick acting, manually shiftable type. However, the high test pressure could, if relieved quickly, cause serious damage to personnel in and around the test site. Thus, the bleed valve has instead been a needle type valve having a valving element which is moved toward or away from its seat by a threaded stem.

It is therefore the primary object of this invention to provide apparatus of this type which prevents water loss during the change of hose connections, but which nevertheless permits the fill water to be quickly drained from the pipe, following testing, without having to open the bleed valve or otherwise endanger personnel in and around the test site.

Another object is to provide such apparatus which is of a simple and inexpensive construction and to which existing apparatus of this type may be adapted with a minimum of alteration.

These and other objects are accomplished, in accordance with the illustrated embodiment of the invention, by apparatus of the type described wherein valve means disposed within the means for closing the one end of the pipe to which the pump hoses are interchangeably connected permits water to flow into the pipe, when the fill hose is connected thereto, and upon filling of the pipe and disconnection of the fill hose therefrom, holding the water in the pipe, and then, upon connection of the pressure hose thereto and pressurizing of the water therein, permitting such water to drain from the pipe when said low volume, high pressure pump is stopped. In the preferred and illustrated embodiment of the invention, the valve means includes a first closure member which is mounted within such one closing means for movement between positions opening and closing a passageway through the one closing means to the flow of water into the pipe, the first closure member has port means therein, and a second closure member is mounted on the first closure member for movement between positions opening and closing the port means. More particularly, the first such closure means comprises a flapper having a plurality of ports therethrough and the second closure member comprises a disc for opening and closing the ports.

As illustrated, the valve means comprises a fitting having a body adapted to be mounted in the passageway and having a bore through which water flows into and out of the pipe when the body is so mounted. The flapper is mounted on the body for swinging between positions opening and closing the bore, and each of the flapper and disc is yieldably urged by spring means to its closed position by spring means. More particularly, standard apparatus of this type, wherein the one plug has a threaded hole therein to receive the pin, may be converted merely by threading the bore of the pin to permit the threaded body of the fitting to be connected thereto.

In the drawings, wherein like reference characters are used throughout to designate like parts:

FIG. 1 is a longitudinal sectional view of a length of pipe which is broken intermediate its ends and which is closed at one end by means which is constructed in accordance with the present invention and which includes the above-described flapper swung to open position during filling of the pipe;

FIG. 2 is a longitudinal sectional view of the left end of the pipe and the means for closing same, similar to FIG. 1, but with the flapper closed upon filling of the pipe and with the fill hose connection removed from the pin of the closing means;

FIG. 3 is another longitudinal sectional view of the left end of the pipe and the means for closing same, similar to FIGS. 1 and 2, but upon replacement of the fill hose connection with a pressure hose connection to pressurize the water which fills the pipe, and stoppage of the high pressure pump following the pressure test to permit the above-described disc to open to permit water to be drained from the pipe and back through the pressure hose into the hydraulic system in which the high pressure pump is disposed; and FIG. 4 is a view of the inner side of the flapper, as seen along broken lines 4—4 of FIG. 2.

The length of pipe 10 shown in FIG. 1 has male threads 11 on its right-hand end to which a plug 12 is connected, and female threads 13 on a coupling on its left end to which a left-hand plug 14 is connected. The length of pipe may, of course, be a single joint or several threadedly connected joints. In any event, all of the threaded connections are tested in accordance with the procedures to be described.

As is common in the art, each plug 12 and 14 is of cup shape, and a bleed valve 15 is mounted on at least the right-hand plug 12 to permit air to be vented from the pipe as it is filled with water through the left-hand plug, as will be described. Preferably, a similar bleed valve 15 is also mounted on the left-hand plug 14, and each such bleed valve is of a construction which includes a cap manually shiftable between the open position of FIG. 1 to permit air to be vented from the pipe as it is filled, and the closed position of FIGS. 2 and 3 to permit water which fills the pipe to be pressurized.

The outer end of the left-hand plug 14 has a threaded hole 16 therein to which the inner threaded end 17 of a pin 18 is connected. The pin has a longitudinal bore 19 therein which opens at its inner end to the plug, and means on its outer end to which hoses leading to high volume, low pressure and low volume, high pressure pumps, may be interchangeably connected whereby the pipe may be filled with water and the water then pressurized.

Thus, the outer end of bore 19 connects with ports 20 leading to a cylindrical surface 21 about the outer end of the pin, and seal rings 22 and 23 are carried within grooves about the cylindrical surface on the inner and outer sides of the ports. More particularly, the fill and pressure hoses FH and PH are connected to the fill block FB (FIG. 1) and the pressure block PB (FIG. 3), respectively. Each block is of basically similar construction, except for the size of the threaded ports in each for connection with hoses leading from the pumps. Thus, ports 24 in the fill block FB are of relatively large diameter for connection with the inner threaded end of a relatively large capacity fill hose FH, and the threaded port 25 formed in pressure block PB on the other hand is of relatively small diameter for connection with the inner threaded end of pressure hose PH.

In any event, each block has a cylindrical bore 26 therein which fits closely over the outer cylindrical surface 21 of the pin, and has spaced-apart seal surfaces 27 and 28 on its inner and outer ends for sealably engaging the inner and outer seal rings 22 and 23, respectively, when the block is moved into position over the pin surface 21. As shown, when the block is so positioned, its inner end engages a shoulder about the pin at the inner end of the cylindrical surface 21 thereabout. When so positioned, the block serves to connect either the fill hose FH or the pressure hose PH with the bore 19 of the pin, and thus to permit the pipe to be filled with water, the water pressurized, or the water drained from the pipe back into the pipe to which the hose connects. Inasmuch as the seal rings 22 and 23 are of the same effective sealing diameter, the forces on each block due to water pressure are balanced so that neither must be secured in its connecting position.

As indicated diagrammatically in FIG. 1, fill hose FH connects fill block FB with a pump LPP which is of low pressure, high volume type, and which receives water from a reservoir R located at the test site. The hydraulic system also includes a bypass line BPL, which has a valve V installed therein. As the pipe is filled, the valve V is closed.

Each of the bleed valves 15 is open as the pipe is filled, as shown in FIG. 1, and until fill water reaches the level of the connection of each valve with its pump. When the pipe has been filled, and the bleed valves 15 closed, the fill block FB is removed from the surface 21 of the pin, as indicated in FIG. 2, and then replaced with the pressure block PB. As shown in FIG. 3, the pressure block is connected by pressure hose PH with pump HPP of a high pressure, low volume type. This pump is connected in a hydraulic system the same as or similar to that shown in FIG. 1 so as to receive water from a reservoir R.

Since the present invention makes it unnecessary to make up water lost from the pipe during the interchange of blocks, the pump HPP immediately begins to pressurize the water which fills the pipe. The hydraulic system in which high pressure pump HPP is installed also includes a bypass line BPL having a valve V therein, which, as will be described, and as shown in FIG. 3, is opened upon closing of pump HPP to permit water to drain from the pipe through the pressure hose PH.

When water has been drained from the pipe, as will be described to follow, pressure block PB may be removed from the pin 18, and each of the plugs and thus the pin may be removed from the opposite ends of the pipe for installation on another length of pipe. The use of separate fill and pressure blocks enables the fill block to be installed on a pin connected to another pipe for the purpose of filling that other pipe as the already filled pipe is pressurized with a pressure block which has replaced the fill block. In this sense, this type of apparatus using separate connections for each of the fill and pressure hose, is especially well suited for use in a production line testing procedure.

As previously described, the fitting which is mounted in the means for closing the left-hand end of the pipe 10 includes a tubular body 30 whose outer end is threaded at 31 for connection to threads 32 about the inner end of bore 19 of pin 18. The inner end of the body is counterbored at 34 to provide a seat 35 about its bore 33, and a flapper 36 is pivotally mounted on the body 30 for swinging about a transverse axis between a closed position over the seat 35, as shown in FIGS. 2 and 3, and an open position to one side of the seat, as shown in FIG. 1. In this latter open position, the flapper permits water to be pumped into the pipe, but, when the low pressure pump LPP is stopped, the flapper 36 is urged to the closed position of FIGS. 2 and 3 so as to hold the fill water therein, and thus permit fill block FB to be replaced with pressure block PB without the loss of water from the pipe.

More particularly, the flapper is pivotally mounted on the upper side of the inner end of body 30 by means of a pin 37 extending through aligned holes in the flapper and body. A torsion spring 38 surrounds the pin and engages at its opposite ends with the body and the inner side of the flapper so as to normally urge the flapper to its closed position. The force with which the flapper is urged to closed position is of course overcome by the pressure of the low pressure pump LPP during filling of the pipe.

The flapper has a plurality of ports 39 which extend therethrough to connect the bore 33 with the pipe when the flapper is in closed position. As shown in FIG. 4, there are a circle of such ports arranged concentrically of the center of the flapper adapted to be opened and closed by means of a disc 40 which is mounted on the inner end of a rod 41 extending through a central hole 42 in the flapper. A coil spring 43 surrounding the rod is compressed between the inner side of the flapper and an enlarged head on the inner end of the pin so as to normally urge the disc to seated position on the outer side of the flapper for closing ports 39.

When the pipe has been filled with water, and the flapper has returned to the closed position shown in FIG. 2, the disc is held by spring 43 in its closed position. Thus, the spring holds the hydrostatic pressure of the water which fills the pipe, and thus prevents the loss of water as the fill block FB is replaced by the pressure block PB. Then, when the pressure block PB has been installed in the pin 18, and the high pressure pump HPP is started, the flapper is again swung upwardly to its open position in order to permit the water which fills the pipe to be pressurized.

Upon completion of the pressure test, and stopping of the high pressure pump, the flapper will again swing downwardly to its closed position. Then, when valve V in bypass line BPL is opened to permit water pressure within the hose PH, and thus the pin 18, to fall below the pressure of the water within the pipe, the disc 40 will be forced open to permit water to drain through the ports 39 into the bore 19 of the pin and thus into the pressure hose PH, and through the valve V in bypass line BPL back to the reservoir R of the hydraulic system. Thus, the disc acts as a pressure regulator to maintain a certain pressure differential between the inside of the pipe and within the hydraulic system which is somewhat greater than the contemplated hydrostatic pressure of the pipe when filled. The small amount of water which is left in the pipe, and which does not drain through the ports 39, will of course be drained therefrom as the plug 14 including the fitting which is mounted therein is removed from the left-hand end of the pipe.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in hydrostatically testing a length of pipe, comprising means for closing each end of the pipe, one such closing means having port means to which fill and pressure hoses from high volume, low pressure and low volume, high pressure pumps may be respectively interchangeably connected, and valve means within the one closing means for permitting water to flow into the pipe when the fill hose from the high volume, low pressure pump is connected to said port means, and, upon filling of the pipe with water and disconnection of the fill hose from the port means, holding the water in the pipe, and then, upon connection of the pressure hose from the low volume, high pressure pump to said port means and pressurizing of the water within the pipe, permitting such water to drain from the pipe when said low volume, high pressure pump is stopped.

2. Apparatus of the character defined in claim 1, wherein the valve means includes a first closure member mounted within the closing means for movement between positions opening and closing a passageway through the one closing means to the flow of water into the pipe, said first closure member having port means therein, and a second closure member mounted on the first closure member for movement between positions opening and closing the port means to the flow of water out of the pipe.

3. Apparatus of the character defined in claim 2, wherein the first closure member comprises a flapper having a plurality of ports therein, and the second closure member comprises a disc for opening and closing the ports.

4. In apparatus for use in hydrostatically testing a length of pipe, comprising means for closing each end of the pipe, one such closing means having a passageway therethrough to which hoses from high volume, low pressure and low volume, high pressure pumps may be interchangeably connected for first filling the pipe with water and then pressurizing the water, and a fitting including a body adapted to be mounted in the passageway and having a bore through which water flows into and out of the pipe when the body is so mounted, a first closure member mounted on the body for movement between positions opening and closing the bore to the flow of water into the pipe, spring means yieldably urging the first closure member to closed position, said first closure member having port means therethrough, and a second closure member mounted on the first closure member for movement between positions opening and closing the port means to the flow of water out of the pipe, and spring means urging the second closure member to closed position.

5. Apparatus of the character defined in claim 4, wherein the first closure member is a flapper pivotally mounted on the body, the port means comprises a series of ports in the flapper, and the second closure member is a disc mounted on the outer side of the flapper for movement toward and away from the ports.

6. In apparatus for use in hydrostatically testing a length of pipe, wherein a means is provided for closing each end of the pipe, and one such closing means has a passageway therethrough to which hoses from high volume, low pressure and low volume, high pressure pumps may be interchangeably connected for first filling the pipe with water and then pressurizing the water; the improvement comprising a fitting including a tubular body having means for mounting it within the passageway of the one closing means with its bore forming a continuation of the passageway, a first closure member mounted on the body for movement between positions opening and closing the bore therethrough, spring means yieldably urging the first closure member to closed position, said first closure member having ports therethrough, and a second closure member mounted on the first closure member for movement between positions opening and closing the ports, and spring means urging the second closure member to closed position.

7. Apparatus of the character defined in claim 6, wherein the first closure member is a flapper pivotally mounted on the body, the port means comprises a series of ports in the flapper, and the second closure member is a disc mounted on the outer side of the flapper for movement toward and away from the ports.

8. In apparatus for use in hydrostatically testing a pipe, wherein a plug is threadedly connected to each end of the pipe for closing same, and one such plug has a threaded hole therein; the improvement comprising a pin having threads for connection to the threaded hole in the plug, a bore therein which opens to the plug, and means to which hoses from high volume, low pressure and low volume, high pressure pumps may be interchangeably connected for first filling the pipe with water and then pressurizing the water, a fitting including a tubular body having means for mounting it within the bore of the pin with its bore forming a continuation of the pin bore, a flapper pivotally mounted on the body for swinging between positions opening and closing the bore therethrough, spring means yieldably urging the flapper to closed position, said flapper having ports therethrough, and a disc mounted on the outer side of the flapper for movement toward and away from the flapper between positions opening and closing the ports, and spring means urging the disc to closed position.

9. For use in hydrostatically testing a pipe, the combination of a plug having threads thereon for connecting it to one end of the pipe, and a threaded hole therein which opens to the pipe when the plug is connected thereto, a pin having threads thereabout for connection to the threaded hole in the plug, and a threaded bore therein which opens to the plug when the pin is connected thereto, and means to which hoses from high volume, low pressure and low volume, high pressure pumps may be interchangeably connected for first filling the pipe with water and then pressurizing the water, and a fitting including a tubular body having threads thereabout for threadedly connecting it to the threaded bore of the pin with the bore opening to the pin bore, a flapper pivotally mounted on the body for swinging between a position closing the bore therethrough and a position to one side thereof, spring means yieldably urging the flapper to closed position, said flapper having ports therethrough, a disc mounted on the outer side of the flapper for movement toward and away from the flapper between positions opening and closing the ports, and spring means urging the disc to closed position.

* * * * *